US010738709B2

(12) United States Patent
Forest et al.

(10) Patent No.: US 10,738,709 B2
(45) Date of Patent: Aug. 11, 2020

(54) MULTI-SPOOL GAS TURBINE ENGINE

(71) Applicant: PRATT & WHITNEY CANADA CORP., Longueuil (CA)

(72) Inventors: Jean-Jacques Forest, Verdun (CA); Martin Poulin, Mont Saint-Hilaire (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 611 days.

(21) Appl. No.: 15/428,776

(22) Filed: Feb. 9, 2017

(65) Prior Publication Data
US 2018/0223740 A1  Aug. 9, 2018

(51) Int. Cl.
*F02C 7/36* (2006.01)
*F02C 7/268* (2006.01)
*F02C 3/10* (2006.01)
*F02C 7/32* (2006.01)

(52) U.S. Cl.
CPC .................. *F02C 7/36* (2013.01); *F02C 3/10* (2013.01); *F02C 7/268* (2013.01); *F02C 7/32* (2013.01); *F05D 2220/323* (2013.01); *F05D 2260/40* (2013.01); *F05D 2260/85* (2013.01)

(58) Field of Classification Search
CPC .. F02C 7/26; F02C 7/266; F02C 7/268; F02C 7/275; F02C 7/32; F02C 7/36; F05D 2260/85
See application file for complete search history.

(56) References Cited

U.S. PATENT DOCUMENTS

| 2,548,975 | A | 4/1951 | Hawthorne |
| 2,955,424 | A | 10/1960 | Ryniszak |
| 4,141,212 | A | 2/1979 | Koschier |
| 4,251,987 | A | 2/1981 | Adamson |

(Continued)

FOREIGN PATENT DOCUMENTS

| CA | 2562290 C | 10/2013 |
| EP | 0103370 | 3/1984 |

(Continued)

OTHER PUBLICATIONS

European Search Report dated Jun. 25, 2018 in corresponding EP application n°18156187.9.

(Continued)

*Primary Examiner* — Ehud Gartenberg
*Assistant Examiner* — Jacek Lisowski
(74) *Attorney, Agent, or Firm* — Norton Rose Fulbright Canada LLP

(57) ABSTRACT

A gas turbine engine has a LP spool including an LP shaft and a HP spool including an HP shaft, an accessory gear box (AGB) drivingly engaged to a plurality of accessories, an engine starter drivingly engaged to the AGB, and a drive shaft drivingly engaged to the AGB. In a first engine mode, the drive shaft is drivingly engaged to the HP shaft and is disengaged from the LP shaft, the engine starter is in driving engagement with the HP shaft via the drive shaft, and the LP shaft is disengaged from the AGB. In a second engine mode, the drive shaft is drivingly engaged to the LP shaft and is disengaged from the HP shaft, the LP shaft is in driving engagement with the AGB via the drive shaft, and the HP shaft is disengaged from the AGB.

18 Claims, 4 Drawing Sheets

(56) References Cited

U.S. PATENT DOCUMENTS

| | | |
|---|---|---|
| 4,685,286 A | 8/1987 | Hetzer et al. |
| 4,815,282 A | 3/1989 | Wilkinson et al. |
| 4,817,382 A | 4/1989 | Rudolph et al. |
| 5,119,624 A | 6/1992 | McKenna |
| 6,041,589 A | 3/2000 | Giffin, III et al. |
| 6,082,967 A | 7/2000 | Loisy |
| 6,735,954 B2 | 5/2004 | MacFarlane et al. |
| 6,865,891 B2 | 3/2005 | Walsh et al. |
| 6,895,741 B2 | 5/2005 | Rago et al. |
| 6,901,759 B2 | 6/2005 | Frutschi |
| 7,055,303 B2 | 6/2006 | Macfarlane et al. |
| 7,144,349 B2 | 12/2006 | Mitrovic |
| 7,168,913 B2 | 1/2007 | Lardellier |
| 7,500,365 B2 | 3/2009 | Suciu et al. |
| 7,552,591 B2 | 6/2009 | Bart et al. |
| 7,690,185 B2 | 4/2010 | Linet et al. |
| 7,698,884 B2 | 4/2010 | Maguire et al. |
| 7,707,909 B2 | 5/2010 | Linet et al. |
| 7,758,302 B2 | 7/2010 | Linet et al. |
| 7,997,085 B2 | 8/2011 | Moniz et al. |
| 8,176,725 B2 | 5/2012 | Norris et al. |
| 8,209,952 B2 | 7/2012 | Ress, Jr. |
| 8,350,398 B2 | 1/2013 | Butt |
| 8,459,038 B1 | 6/2013 | Lickfold et al. |
| 8,464,511 B1 | 6/2013 | Ribarov et al. |
| 8,500,583 B2 | 8/2013 | Goi et al. |
| 8,516,789 B2 | 8/2013 | Kupratis |
| 8,568,089 B2 | 10/2013 | Lemmers, Jr. et al. |
| 8,621,871 B2 | 1/2014 | McCune et al. |
| 8,794,922 B2 | 8/2014 | Bart et al. |
| 8,876,650 B2 | 11/2014 | Lemmers, Jr. |
| 9,062,611 B2 | 6/2015 | Sheridan |
| 9,145,834 B2 | 9/2015 | Frost et al. |
| 9,297,305 B2 | 3/2016 | Drachsler et al. |
| 9,328,667 B2 | 5/2016 | MacFarlane |
| 9,341,121 B2 | 5/2016 | Kupratis |
| 9,353,848 B2 | 5/2016 | Blewett et al. |
| 9,512,784 B2 | 12/2016 | Morgan et al. |
| 9,828,911 B2 | 1/2017 | Burghardt |
| 9,752,500 B2 | 9/2017 | Ullyott et al. |
| 9,890,704 B2 | 2/2018 | Speak et al. |
| 2004/0065091 A1* | 4/2004 | Anderson ............. F02C 7/268 60/778 |
| 2007/0022735 A1* | 2/2007 | Henry ............. F02C 7/36 60/39.162 |
| 2008/0006023 A1 | 1/2008 | Lardellier |
| 2008/0148881 A1 | 6/2008 | Moniz et al. |
| 2011/0101693 A1 | 5/2011 | Goi |
| 2012/0317991 A1 | 12/2012 | Frost et al. |
| 2013/0056982 A1 | 3/2013 | Gozdawa |
| 2014/0130352 A1 | 5/2014 | Buldtmann et al. |
| 2014/0250862 A1 | 9/2014 | Suciu et al. |
| 2014/0252160 A1 | 9/2014 | Suciu et al. |
| 2014/0260295 A1 | 9/2014 | Ullyott et al. |
| 2014/0290265 A1 | 10/2014 | Ullyott et al. |
| 2015/0369123 A1 | 12/2015 | Hanrahan |
| 2016/0040601 A1 | 2/2016 | Frost et al. |
| 2016/0169118 A1 | 6/2016 | Duong |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0333791 A1 | 11/2016 | Snyder et al. |
| 2016/0363055 A1 | 12/2016 | Edwards |
| 2017/0122122 A1 | 5/2017 | Lepretre |
| 2017/0211484 A1 | 7/2017 | Sheridan |

FOREIGN PATENT DOCUMENTS

| | | |
|---|---|---|
| EP | 0860593 B1 | 9/2003 |
| EP | 2192291 A2 | 6/2010 |
| EP | 2192291 A3 | 6/2010 |
| EP | 2226487 | 9/2010 |
| EP | 2320067 | 5/2011 |
| EP | 1959114 B1 | 5/2012 |
| EP | 2535544 A2 | 12/2012 |
| EP | 3135882 A1 | 3/2017 |
| GB | 713839 | 8/1954 |
| WO | WO2008044973 | 4/2008 |
| WO | WO2008082336 | 7/2008 |
| WO | WO2009067048 | 5/2009 |
| WO | 20150122948 | 8/2015 |
| WO | WO2015122948 | 8/2015 |
| WO | WO2017/198999 | 11/2017 |

OTHER PUBLICATIONS

A New Approach to Turboshaft Engine Growth, M. A. Compagnon, General Electric Company, Lynn, Massachusetts pp. 80-41-1 to 80-41-6, May 13, 1980.

U.S. Appl. No. 15/384,959, filed Dec. 20, 2016.

* cited by examiner

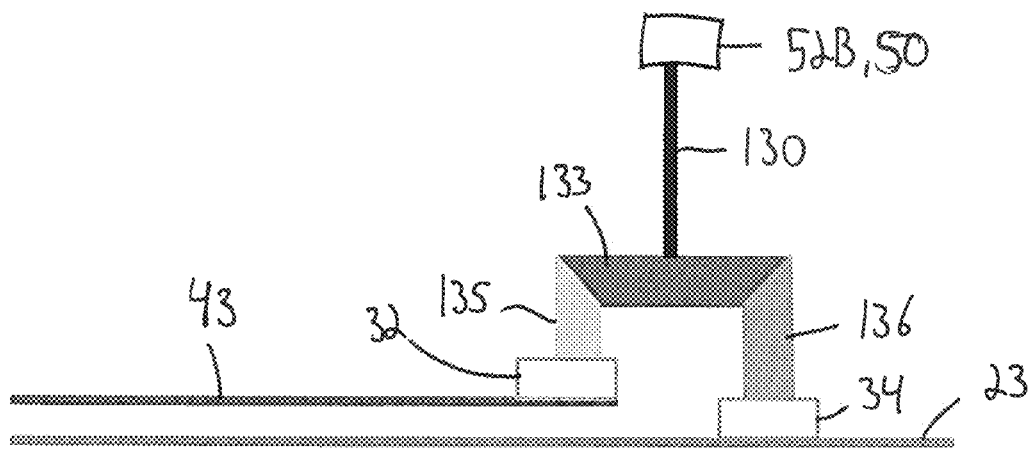
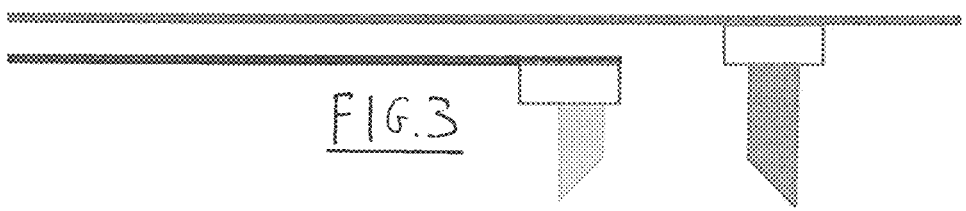
FIG. 3
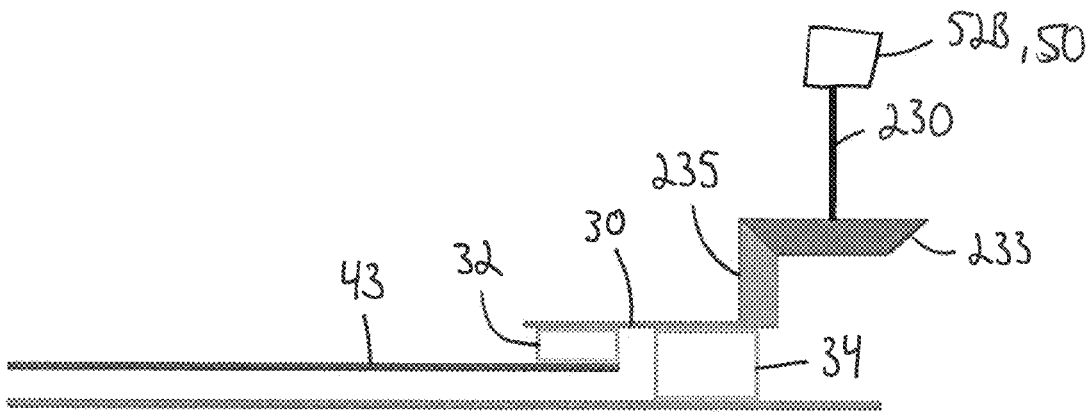
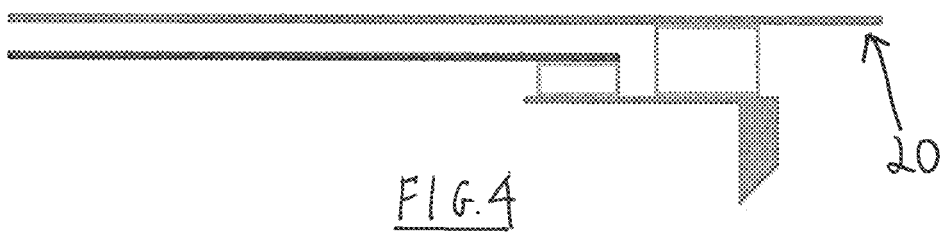
FIG. 4

MULTI-SPOOL GAS TURBINE ENGINE

TECHNICAL FIELD

The application relates generally to gas turbine engines and, more particularly, to multi-spool gas turbine engines.

BACKGROUND OF THE ART

Gas turbine engines, particularly those which power aircraft, are typically provided with accessories such as electrical generators, pumps and the like, which are required for operation of the engine and an associated aircraft. It is common practice to drivingly engage such accessories to the engine by means of an accessory gearbox which is itself drivingly engaged to high pressure shaft of the engine, so as to be able to drive the high pressure shaft and the accessories during engine start-up. However, the drive of the accessories have an impact on the fuel efficiency of the engine.

SUMMARY

In one aspect, there is provided a gas turbine engine, comprising a low pressure (LP) spool including an LP shaft and a high pressure (HP) spool including an HP shaft, the LP and HP shafts rotatable independently of one another about a central axis, an accessory gear box (AGB) drivingly engaged to a plurality of accessories, an engine starter drivingly engaged to the AGB, and a drive shaft drivingly engaged to the AGB, wherein: in a first engine mode, the drive shaft is drivingly engaged to the HP shaft and is disengaged from the LP shaft, the engine starter is in driving engagement with the HP shaft via the drive shaft, and the LP shaft is disengaged from the AGB; and in a second engine mode, the drive shaft is drivingly engaged to the LP shaft and is disengaged from the HP shaft, the LP shaft is in driving engagement with the AGB via the drive shaft, and the HP shaft is disengaged from the AGB.

In another aspect, there is provided a gas turbine engine, comprising: a low pressure (LP) spool including an LP shaft; a high pressure (HP) spool including an HP shaft, the LP and HP shafts rotatable about a central axis; an accessory gear box (AGB) drivingly engaged to a plurality of accessories; an engine starter drivingly engaged to the AGB; and a drive shaft drivingly engaged to the AGB, the drive shaft in selective driving engagement with the HP shaft via a first clutch, the drive shaft in selective driving engagement with the LP shaft via a second clutch, wherein when the first clutch is engaged and the second clutch is disengaged, the engine starter is in driving engagement with the HP shaft via the drive shaft and the AGB is rotatable independently of the LP shaft, and when the first clutch is disengaged and the second clutch is engaged, the LP shaft is in driving engagement with the AGB and the AGB is rotatable independently of the HP shaft.

In a further aspect, there is provided a method of operating a gas turbine engine comprising a high pressure (HP) spool, a low pressure (LP) spool, and an accessory gear box (AGB) drivingly engaged to a plurality of accessories, the method comprising: in a first engine mode, driving the HP spool with a drive shaft while rotating the drive shaft independently of the LP spool, and driving the AGB to drive the accessories; and in a second engine mode, driving the drive shaft with the LP spool while rotating the drive shaft independently of the HP spool, and driving the AGB with the drive shaft to drive the accessories.

DESCRIPTION OF THE DRAWINGS

Reference is now made to the accompanying figures in which:

FIGS. 3-4 are schematic cross-sectional view of an engagement between a drive shaft and spools of a gas turbine engine such as shown in FIG. 1, in accordance alternate embodiments.

DETAILED DESCRIPTION

Figure 1:
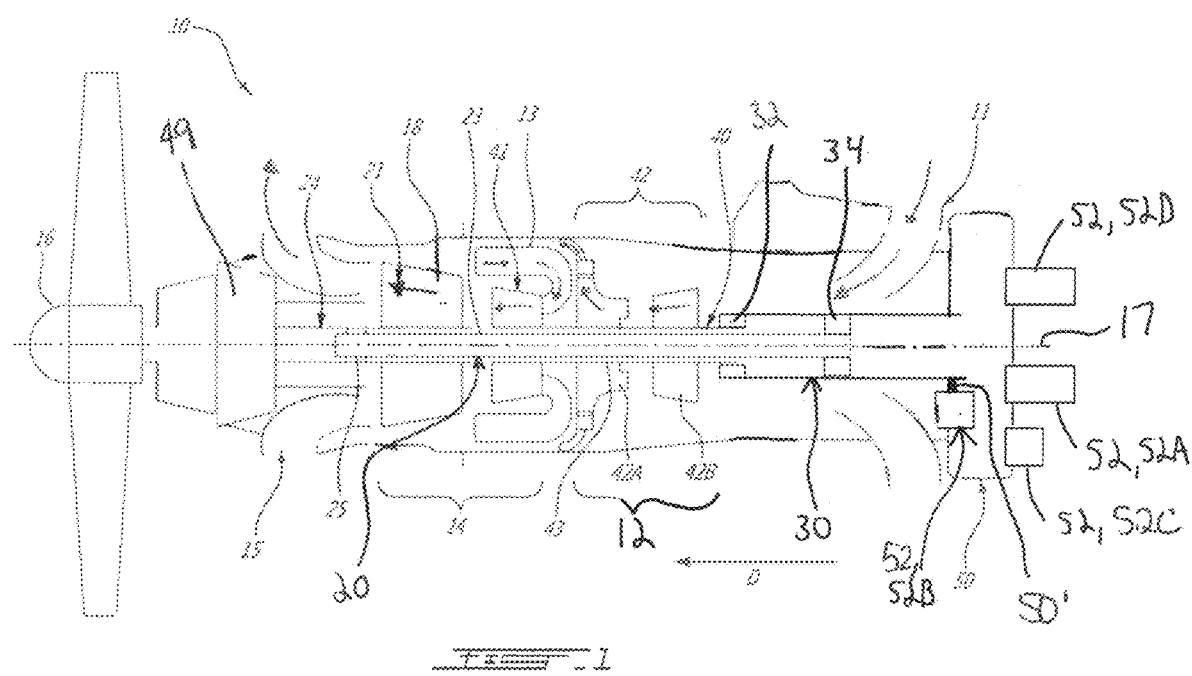
FIG. 1 is a schematic cross-sectional view of a gas turbine engine in accordance with a particular embodiment.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16. In alternate embodiments, the engine 10 is a "through-flow" engine 10 where gases flow through the engine 10 from a front end in a direction opposite to the direction D away from the propeller 16.

It will thus be appreciated that the expressions "forward" and "aft" used herein refer to the relative disposition of components of the engine 10, in correspondence to the "forward" and "aft" directions of the engine 10 and an aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about the center axis 17. However, it is understood that a multi-spool engine could have more than two spools.

It is understood that the term "spool" as used herein is intended to broadly refer to drivingly connected turbine and compressor rotors and is, thus, not limited to a compressor and turbine assembly on a single shaft, and includes for example a rotary assembly with multiple shafts geared together.

The LP spool 20 includes at least one component to extract energy from the combustion gases that is part of the turbine section 14. In an alternate embodiment, and as described in greater detail below, the LP spool 20 also includes at least one component to compress the air that is part of the compressor section 12. The LP spool 20 has a LP turbine 21 which extracts energy from the combustion gases. The LP turbine 21 (also referred to as the power turbine or "PT") drives an axially-extending LP shaft 23. The LP shaft 23 is coaxial with the central axis 17 of the engine 10 and extends forward of the LP turbine 21. The LP shaft 23 is not limited to the configuration depicted in FIG. 1, and can also mechanically couple to the LP turbine 21 in any other suitable way provided that a rotational drive is transmitted from the LP turbine 21 to the LP shaft 23. In the depicted embodiment, the LP turbine 21 is an axial rotatable component having an axis of rotation that is coaxial with the center axis 17. The LP turbine 21 can include one or more stages, depending upon the desired engine thermodynamic cycle, for example.

Still referring to FIG. 1, the engine 10 includes an output shaft 24. The output shaft 24 extends forwardly from the LP turbine 21 and is drivingly engaged thereto. In the illustrated example, the output shaft 24 is distinct from the LP shaft 23 and mechanically coupled thereto, for example by a spline 25 allowing for the transfer of torque between the output shaft 24 and the LP shaft 23. Other mechanical techniques can also be used to interconnect the LP and output shafts 23, 24. For example, the LP and output shafts 23, 24 can be interconnected by curvic coupling, pins, and interference fits. Other configurations of the output shaft 24 and the LP shaft 23 are also possible. For example, the output shaft 24 and the LP shaft 23 can be a single shaft driven by the LP turbine 21. The output shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged (e.g. via a reduction gearbox 49) to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21.

Still referring to FIG. 1, the HP spool 40 has at least one component to compress the air that is part of the compressor section 12, and at least one component to extract energy from the combustion gases that is part of the turbine section 14. The HP spool 40 is also disposed along the axis 17 and includes an HP turbine 41 drivingly engaged to an HP compressor 42 by an HP shaft 43 rotating independently of the LP shaft 23, for example by having rotors of the HP turbine 41 and HP compressor 42 directly connected to the HP shaft 43. Similarly to the LP turbine 21, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

Still referring to the embodiment shown in FIG. 1, the engine 10 also includes an accessory gearbox (AGB) 50. The AGB 50 receives a rotational output and in turn drives accessories 52 that contribute to the functionality of the engine 10. FIG. 1 shows the following accessories: a fuel pump 52A, an engine starter 52B, a (permanent magnet alternator (PMA) 52C, and an oil pump 52D. It will be appreciated that the AGB 50 can include other accessories 52 as well, and that the position of the accessories can be different from that shown. During operation of the engine 10, a rotational drive is transmitted to the AGB 50 to thereby drive the accessories 52 drivingly engaged to the outputs (e.g. gears, shafts, etc.) of the AGB 50.

The engine 10 also includes a drive shaft 30 to transmit and receive a rotational drive. The drive shaft 30 serves as an intermediary mechanical linkage between the AGB 50, engine starter 52B, and the LP and HP spools 20, 40. The drive shaft 30 is operable to transmit a rotational drive either from the engine starter 52B to the HP spool 40 and AGB 50, or from the LP spool 20 to the AGB 50, depending on the engine mode. The drive shaft 30 is accordingly drivingly engaged to the AGB 50, and selectively drivingly engageable to the LP and HP spools 20, 40.

In the embodiment of FIG. 1, the drive shaft 30 is drivingly engaged to the AGB 50, and to one of the HP shaft 43 and the LP shaft 23 in alternate engagement. Therefore, at any given engine operating condition, the AGB 50 is drivingly engaged, via the drive shaft 30, to the HP spool 40 or to the LP spool 20. The depicted embodiment therefore shows two distinct engine operating modes: a first engine mode where the drive shaft 30 is drivingly engaged to HP shaft 43, and a second engine mode where the drive shaft 30 is drivingly engaged to the LP shaft 23. The drive shaft 30 is separate and distinct from both the LP and HP shafts 23, 43. The expression "drivingly engaged" used herein refers to the mechanical coupling of two components, regardless of whether such coupling is direct or indirect, such that a rotational drive is transmitted from one component to the other. In the depicted embodiment, the drive shaft 30 is one shaft having a hollow interior and is coaxial with both the LP and HP shafts 23, 43. Other configurations for the drive shaft 30 are possible, non-limiting examples of which are described further below.

The engine starter 52B is drivingly engaged to the drive shaft 30, either directly or via the AGB 50. During at least the first engine mode, the engine starter 52B provides a rotational drive to the drive shaft 30 and to the AGB 50 (either directly or via the drive shaft 30). It will therefore be appreciated that the engine starter 52B can take any suitable form, or be drivingly engaged to the drive shaft 30 using any suitable configuration, to accomplish such functionality. For example, and as shown in FIG. 1, the engine starter 52B is configured as or includes an electric starter/generator drivingly engaged to the drive shaft 30, for example by a gear engagement 50'; the gear engagement 50' can be defined by part of the AGB 50. In certain engine operating conditions, such as the second engine mode where the drive shaft 30 drivingly engages the AGB 50 to the LP shaft 23, the drive shaft 30 is driven by the LP shaft 23 such that the drive shaft 30 provides rotational drive to the starter/generator 52B to generate electricity. In another embodiment, the engine starter 52B is an air turbine starter drivingly engaged to the drive shaft 30. The air turbine starter is itself driven using any suitable techniques, such as by supplying it with pressurized air or electrical power from a ground cart or an auxiliary power unit (APU). It will therefore be appreciated that many different types of engagements or connections, whether direct or indirect, between the engine starter 52B and the drive shaft 30 (directly or via the AGB 50) are within the scope of the present disclosure.

In the first engine mode, the drive shaft 30 is drivingly engaged to the engine starter 52B, to the AGB 50, and to the HP shaft 43. The drive shaft 30 is however disengaged from the LP shaft 23, and the AGB 50 is rotatable independently of the LP shaft 23. The term "disengaged" used herein refers to the mechanical relationship between two components, in that the components are not mechanically linked together such that the rotational drive produced by one component is not transferred to the other component. During operation of the engine 10 in the first engine mode, the engine starter 52B drives the AGB 50 (directly or via the drive shaft 30) so as to drive the accessories 52, and also drives the HP spool 40 via the drive shaft 30. Since the drive shaft 30 is disengaged from the LP shaft 23, the rotational drive received from the engine starter 52B and provided by the drive shaft 30 has no effect on the LP spool 20.

The engine 10 may be operated in the first engine mode during engine start-up, for example. The drive provided by the drive shaft 30 to the HP spool 40 rotates the HP compressor 42 to thereby provide compressed air to the core 18 of the engine 10. When the compressed air is mixed with fuel and ignited in the combustor 13, the combustion gases generated will drive both the HP turbine 41 and the LP turbine 21, thereby starting the rotation of the LP spool 20. Therefore, the drive provided by the drive shaft 30 is not used to directly start-up the LP spool 20, thus avoiding driving of the "low pressure" components (e.g. the propeller 16, any LP compressor, the LP shaft 23, etc.) with the engine starter 52B. The drive provided by the engine starter 52B to the AGB 50 (either directly or via the drive shaft 30) drives at least the fuel pump 52A and the oil pump 52D required to start the engine 10. It can thus be appreciated that in the first engine mode, the engine starter 52B drives the drive shaft 30 and the accessories 52.

In the second engine mode, the drive shaft 30 drivingly engages the AGB 50 to the LP shaft 23. The drive shaft 30 is however disengaged from the HP shaft 43, and the AGB is rotatable independently of the HP shaft 43. During operation of the engine 10 in the second engine mode, the LP spool 20 drives the drive shaft 30 which in turn drives the AGB 50 and the accessories 52. Since the drive shaft 30 is disengaged from the HP shaft 43, the AGB 50 and accessories 52 are driven by the LP spool 20 via the drive shaft 30, independently of the HP shaft 43 and HP spool 40. The engine 10 may be operated in the second engine mode during the normal running condition of the gas turbine engine, for example during flight. It will therefore be appreciated that the work of driving the accessories 52 in the second engine mode is performed by the LP spool 20; in a particular embodiment, the LP spool 20 is more efficient in terms of fuel consumption than the HP spool 40, and accordingly driving the AGB 50 and accessories 52 with the LP spool 20 instead of the HP spool 40 may allow to increase the fuel efficiency of the engine.

In light of the preceding, it will be appreciated that in a particular embodiment the work of driving the accessories 52 that contribute to the functionality of the engine 10 is transferred away from the less efficient HP spool 40 during normal operation of the engine (second mode), while still allowing the accessories 52 and HP spool 40 to be driven by the engine starter 52B during start-up of the engine (first engine mode). The architecture of the engine 10 disclosed herein however uses the same drive shaft 30 to transfer the rotational power between the selected spool and the engine starter 52B/AGB 50 in both modes of operation.

The selective engagement of the drive shaft 30 with the LP and HP spools 20, 40 can be achieved using any suitable arrangement, one of which is now described in greater detail. Still referring to FIG. 1, the engine 10 includes a first clutch 32 and a second clutch 34. The first clutch 32 selectively engages the drive shaft 30 to the HP shaft 43, and the second clutch 34 selectively engages the drive shaft 30 to the LP shaft 23.

Figure 2:
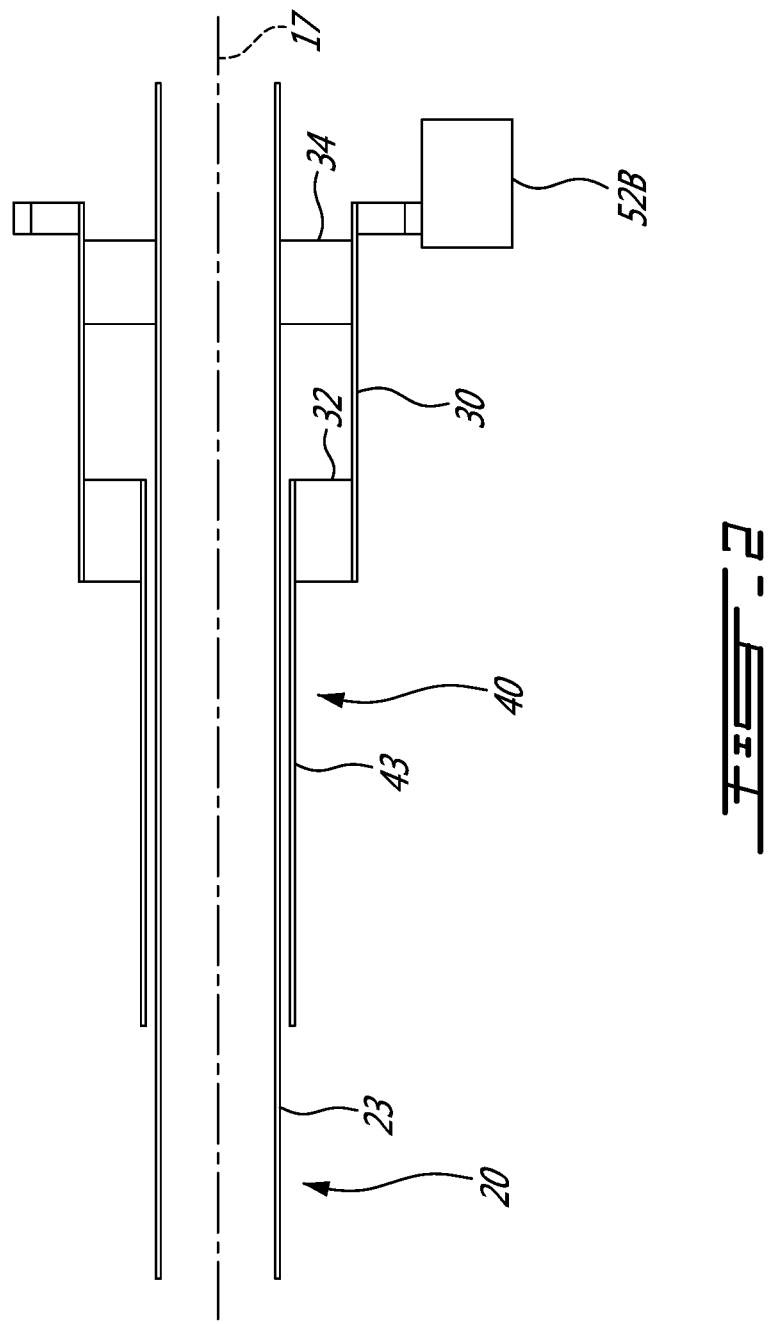
FIG. 2 is an enlarged schematic cross-sectional view of an engagement between a drive shaft and spools of the gas turbine engine of FIG. 1.

Referring to FIG. 2, in the first engine mode, the first clutch 32 drivingly engages the drive shaft 30 to the HP shaft 43, and the second clutch 34 is disengaged so that the drive shaft 30 and the LP shaft 23 are rotatable independently from one another. This selective engagement of the drive shaft 30 with the HP shaft 43 allows the drive shaft 30 to transfer the rotational drive from the engine starter 52B to the HP spool 40 in the first engine mode. In the second engine mode, the first clutch 32 is disengaged so that the drive shaft 30 and the HP shaft 43 are rotatable independently from one another, and the second clutch 34 drivingly engages the drive shaft 30 to the LP shaft 23. This selective engagement of the drive shaft 30 with the LP shaft 23 allows the LP shaft 23 to transfer rotational drive to the AGB 50/accessories 52 via the drive shaft 30 in the second engine mode.

In the illustrated embodiment, the first and second clutches 32, 34 are one-way clutches, such as "sprag" clutches, which automatically engage components having a relative rotation in one direction but allow free rotation in the other direction. For example, the first one-way clutch 32 connects the drive shaft 30 to drive the HP shaft 43 during start-up, until the combustion process rotates the HP shaft 43 faster than the rotational speed of the drive shaft 30 (for example, when the engine starter 52B is shut down). The torque on the first one-way clutch 32 reaches zero and starts to be applied in the opposite direction, and the first one-way clutch 32 is disengaged. The drive shaft 30, no longer driven, tends to slow down, which causes the second one-way clutch 34 to engage the drive shaft 30 to the rotating LP shaft 23, and maintain this engagement. Since the HP shaft 43 rotates faster than the LP shaft 23 (and drive shaft 30 engaged thereto), the first one-way clutch 32 remains disengaged. Other suitable clutch configurations may alternately be used. For example, the clutches 32, 34 may be designed to be disengaged due to centrifugal forces, or may include electric switches, electronic switches, hydraulic actuation or pneumatic actuation to selectively engage and disengage the clutches 32, 34 when required.

It will therefore be appreciated that the embodiment of the engine 10 shown in FIG. 2 operates as follows. In the first engine mode, the engine starter 52B drives the driving shaft 30, which in turn drives the HP shaft 43 and the HP compressor 42 via the first clutch 32 to start the engine 10. The second clutch 34 is disengaged, allowing the drive shaft 30 to rotate independently from the LP shaft 23. During this period of initial engine start-up, the engine starter 52B drives the AGB 50 and accessories 52 (directly or via the drive shaft 30), and drives the HP spool 40 via the drive shaft 30. As the combustion starts, the LP spool 20 becomes active causing the rotational speed of the LP shaft 23 to increase.

In the second engine mode, which may occur for example when the rotational speed of the LP shaft 23 equals or is greater to the rotational speed of the drive shaft 30, the LP shaft 23 engages the drive shaft 30 via the second clutch 34 and they rotate together. Once so engaged, the HP shaft 43 disengages from the drive shaft 30 because of the first clutch 32 and the LP and HP shafts 23, 43 continue to rotate independently from one another. The first clutch 32 is therefore engaged to start the HP spool 40, and is then disengaged once the HP spool 40 has reached a certain rotational speed. The LP shaft 20 in the second engine mode drives the drive shaft 30, which in turn drives the accessories 52 via the AGB 50. This engine architecture therefore allows the accessories 52 engaged to the AGB 50 to be driven by the LP spool 20 and independently of the HP spool 40 during normal use while allowing the engine starter 52B to drive the accessories 52 engaged to the AGB 50 and the HP spool 40 during start-up.

Referring to FIG. 3, an engagement between the drive shaft and spools in accordance with an alternate embodiment is shown, where elements similar to that of the embodiment of FIG. 2 are identified by the same reference numbers and will not be further described herein. In this embodiment, the drive shaft is a tower shaft 130 extending transversely (e.g. perpendicularly or at any other suitable angle) to the LP and HP shafts 23, 43, and drivingly engaged to the AGB 50 and to engine starter 52B either directly or through the AGB 50. The tower shaft 130 has a bevel gear 133 meshed with first and second shaft bevel gears 135, 136. The first shaft bevel gear 135 is selectively engaged to the HP shaft 43 via the first clutch 32. Therefore, the tower shaft 130, via the meshed bevel gears 133,135, is selectively engaged to the HP shaft 43 to provide the rotational drive of the engine starter 52B to the HP shaft 43 in the first engine mode (e.g. start-up). The second shaft bevel gear 136 is selectively engaged to the LP shaft 23 via the second clutch 34. Therefore, the tower shaft 130, via the meshed bevel gears 133, 136, is selectively engaged to the LP shaft 23 in the second engine mode (e.g. normal operation such as during flight). The rotational drive of the LP shaft 23 can therefore be transferred to the AGB 50 via the tower shaft 130.

Referring to FIG. 4, an engagement between the drive shaft and spools in accordance with another embodiment is shown, where elements similar to that of the embodiment of FIG. 2 are identified by the same reference numbers and will not be further described herein. In this embodiment, the drive shaft 30 is concentric with the LP and HP shafts 23, 43, and drivingly engaged to the AGB 50 and to engine starter 52B (either directly or through the AGB 50) by a tower shaft 230 extending transversely (e.g. perpendicularly or at any other suitable angle) to the LP and HP shafts 23, 43. The drive shaft 30 is accordingly drivingly engaged to the tower shaft 230, which is drivingly engaged to the engine starter 52B and AGB 50. The drive shaft 30 in the depicted embodiment has a drive shaft bevel gear 235 meshed with a bevel gear 233 of the tower shaft 230. In the first engine mode (e.g. start-up), the engine starter 52B drives the tower shaft 230, which in turn drives the drive shaft 30 via the meshed bevel gears 233, 235. This drive is transmitted to the HP shaft 43 via the first clutch 32, while the second clutch 34 is disengaged. In the second engine mode (e.g. normal operation), the LP shaft 23 engages the drive shaft 30 via the second clutch 34 and they rotate together, while the first clutch 32 is disengaged. The drive provided by the LP shaft 23 is transferred from the drive shaft 30 to the tower shaft 230 via the meshed bevel gears 233, 235, and ultimately, to the AGB 50 to drive the accessories 52 off the LP spool 20.

Figure 5:
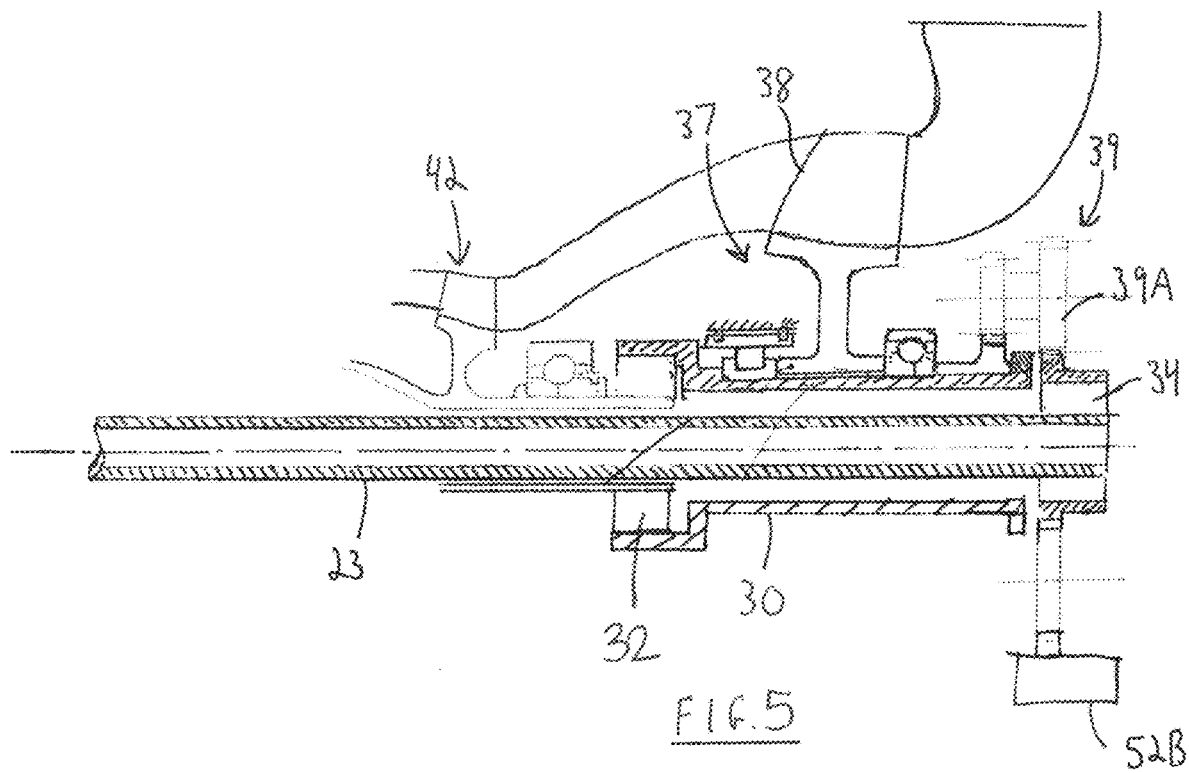
FIG. 5 is an enlarged schematic cross-sectional view of a gas turbine engine showing an engagement between a drive shaft supporting a boost compressor and spools, in accordance with another particular embodiment.

An engine architecture in accordance with an alternate embodiment is shown in FIG. 5. The drive shaft 30 includes a boost compressor 37 having a plurality of rotor blades 38. The boost compressor 37 is a low-pressure compressor (when compared to the HP compressor 42). The boost compressor 37 is connected to the drive shaft 30 using any suitable type of attachment, and may be formed integrally with the drive shaft 30. In the first engine mode (e.g. start-up), the engine starter 52B drives the boost compressor 37 together with the drive shaft 30. In the illustrated embodiment, a pair interconnected gears 39 includes a first gear 39A meshed with a gear drivable by the engine starter 52B and selectively engaged to the LP shaft 23 via the second clutch 34, and a second gear 39B meshed with a gear of the drive shaft 30. In this embodiment, the second clutch 34 in the first engine mode disengages the first gear 39A from the LP shaft 23. In the second engine mode, the second clutch 34 drivingly engages the first gear 39A to the LP shaft 23, and the boost compressor 37 is driven by the LP shaft 23 together with the drive shaft 30. This geared booster configuration allows the boost compressor 37 to be driven during start-up as well as during normal operation. In an alternate embodiment, the boost compressor 37 is connected to the LP shaft 23 and driven thereby.

In a particular embodiment and in use, the HP spool 40 is thus driven by the drive shaft 30 while rotating the drive shaft 30 independently of the LP spool 20 in the first engine mode, e.g. engine start-up. In the first engine mode, the AGB 50 is also driven by the engine starter 52B (either directly or via the drive shaft 30) to drive the accessories 52. In the second engine mode, e.g. normal operation, the drive shaft 30 is driven with the LP spool 20 while rotating the drive shaft 30 independently of the HP spool 40, and the drive shaft 30 drives the AGB 50 to drive the accessories 52.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine, comprising a low pressure (LP) spool including an LP shaft and a high pressure (HP) spool including an HP shaft, the LP and HP shafts rotatable independently of one another about a central axis, an accessory gear box (AGB) drivingly engaged to a plurality of accessories, the AGB mounted in-line with the LP spool and the HP spool, an engine starter drivingly engaged to the AGB, and a drive shaft drivingly engaged to the AGB, the drive shaft extending axially along the central axis, wherein:

in a first engine mode, the drive shaft is drivingly engaged to the HP shaft and is disengaged from the LP shaft, the engine starter is in driving engagement with the HP shaft via the drive shaft, and the LP shaft is disengaged from the AGB; and in a second engine mode, the drive shaft is drivingly engaged to the LP shaft and is disengaged from the HP shaft, the LP shaft is in driving engagement with the AGB via the drive shaft, and the HP shaft is disengaged from the AGB.

2. The engine as defined in claim 1, wherein the engine starter is drivingly engaged to the AGB via the drive shaft.

3. The engine as defined in claim 1, wherein the engine starter includes an electric starter/generator drivingly engaged to the drive shaft, the electric starter/generator in the second engine mode being drivable by the LP spool via the drive shaft.

4. The engine as defined in claim 1, further comprising a boost compressor having a plurality of rotor blades connected to the drive shaft.

5. The engine as defined in claim 1, wherein the drive shaft is selectively engageable to the HP shaft via a first clutch and selectively engageable to the LP shaft via a second clutch, wherein in the first engine mode the first clutch drivingly engages the drive shaft to the HP shaft and the second clutch is disengaged, and in the second engine mode the first clutch is disengaged and the second clutch drivingly engages the drive shaft to the LP shaft.

6. The engine as defined in claim 5, further comprising a boost compressor having a plurality of rotor blades connected to the drive shaft, and pair of interconnected gears including a first gear drivingly engaged to the engine starter and selectively engageable to the LP shaft via the second clutch, and a second gear drivingly engaged with the drive shaft.

7. The engine as defined in claim 5, wherein the first and second clutches are one-way clutches.

8. The engine as defined in claim 1, wherein the drive shaft is drivingly engaged to the AGB via a tower shaft.

9. A gas turbine engine, comprising:
a low pressure (LP) spool including an LP shaft;
a high pressure (HP) spool including an HP shaft, the LP and HP shafts rotatable about a central axis;
an accessory gear box (AGB) drivingly engaged to a plurality of accessories, the central axis extending through the AGB;
an engine starter drivingly engaged to the AGB; and
a drive shaft drivingly engaged to the AGB, the drive shaft extending axially from the AGB, the drive shaft in selective driving engagement with the HP shaft via a first clutch, the drive shaft in selective driving engagement with the LP shaft via a second clutch, wherein when the first clutch is engaged and the second clutch is disengaged, the engine starter is in driving engagement with the HP shaft via the drive shaft and the AGB is rotatable independently of the LP shaft, and when the first clutch is disengaged and the second clutch is engaged, the LP shaft is in driving engagement with the AGB and the AGB is rotatable independently of the HP shaft.

10. The engine as defined in claim 9, wherein the engine starter is drivingly engaged to the AGB via the drive shaft.

11. The engine as defined in claim 9, wherein the engine starter includes an electric starter/generator drivingly engaged to the drive shaft, and wherein when the first clutch is disengaged and the second clutch is engaged, the electric starter/generator is drivable by the LP spool via the drive shaft.

12. The engine as defined in claim 9, further comprising a boost compressor having a plurality of rotor blades connected to the drive shaft.

13. The engine as defined in claim 9, further comprising a pair of interconnected gears including a first gear drivingly engaged to the engine starter and selectively engageable to the LP shaft via the second clutch, and a second gear drivingly engaged with the drive shaft.

14. The engine as defined in claim 9, wherein the first and second clutches are one-way clutches.

15. The engine as defined in claim 9, wherein the drive shaft is drivingly engaged to the AGB via a tower shaft.

16. The engine as defined in claim 9, wherein the plurality of accessories include at least a fuel pump and an oil pump.

17. A method of operating a gas turbine engine comprising a high pressure (HP) spool, a low pressure (LP) spool, an accessory gear box (AGB) drivingly engaged to a plurality of accessories, the AGB mounted in-line with the LP spool and the HP spool, and a drive shaft extending axially along a central axis, the method comprising:
in a first engine mode, driving the HP spool with the drive shaft while rotating the drive shaft independently of the LP spool, and driving the AGB to drive the accessories; and
in a second engine mode, driving the drive shaft with the LP spool while rotating the drive shaft independently of the HP spool, and driving the AGB with the drive shaft to drive the accessories.

18. The method as defined in claim 17, wherein driving the AGB in the first engine mode includes driving the AGB with the drive shaft.

* * * * *